(12) United States Patent
Dean et al.

(10) Patent No.: US 10,077,722 B2
(45) Date of Patent: Sep. 18, 2018

(54) CONTROL OF ENGINE EGR WITH BACKPRESSURE CONTROL VALVE

(75) Inventors: Charles Dean, Royal Oak, MI (US); Manuel Angel Gonzalez Delgado, Rochester Hills, MI (US); Michael J. Lucido, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1673 days.

(21) Appl. No.: 13/556,709

(22) Filed: Jul. 24, 2012

(65) Prior Publication Data

US 2014/0026874 A1  Jan. 30, 2014

(51) Int. Cl.
*F02D 21/08* (2006.01)
*F02D 9/04* (2006.01)
(Continued)

(52) U.S. Cl.
CPC .............. *F02D 21/08* (2013.01); *F01L 1/185* (2013.01); *F01L 13/0005* (2013.01);
(Continued)

(58) Field of Classification Search
CPC ........... F02M 25/0749; F02M 25/0744; F02M 25/0752; F02M 25/0715; F02M 25/0722; F02M 25/0724; F02M 25/0745; F02M 25/0704; F02M 25/0719; F02M 25/077; F02M 25/0771; F02M 25/0779; F02M 31/08; F02M 35/08; F02M 35/10386; F02M 33/06; F02M 31/087; F02M 25/0742; F02M 1/00; F02M 25/0702; F02M 25/0777; F02M 35/10222; F02M 25/0785; F02M 25/0756; F02M 25/0707; F02M 25/0718; F02M 25/0709; F02M 25/0713; F02M 25/0728; F02M 26/06; F02M 26/10; F02M 26/05; F02M 26/01; F02M 26/15; F02M 26/25; F02M 25/0711; F02M 25/074; F02M 25/0798; F02B 77/13; F02B 63/02;
(Continued)

(56) References Cited

U.S. PATENT DOCUMENTS 4,835,963 A * 6/1989 Hardy .............................. 60/274
5,806,308 A * 9/1998 Khair et al. ..................... 60/278
(Continued)

FOREIGN PATENT DOCUMENTS

JP        2000204984 A * 7/2000 ............... F02D 9/04

OTHER PUBLICATIONS

Morishima JP2000204984 Machine Translation.*
AEI Publication titled "Mazda Readies Skyactive Engines" dated Feb. 1, 2011.

Primary Examiner — Hung Q Nguyen
Assistant Examiner — Brian P Monahon
(74) Attorney, Agent, or Firm — Harness, Dickey & Pierce, P.L.C.

(57) ABSTRACT

A method of controlling engine internal exhaust gas recirculation may include estimating a flow restriction through a diesel particulate filter in an exhaust system of an engine assembly and adjusting a backpressure control valve in the exhaust system downstream of the diesel particulate filter based on the flow restriction. A controlled amount of internal exhaust gas recirculation may be provided to the engine assembly based on adjusting the backpressure control valve.

19 Claims, 6 Drawing Sheets

(51) Int. Cl.

| | | |
|---|---|---|
| *F02D 13/02* | (2006.01) | |
| *F02D 41/00* | (2006.01) | |
| *F01L 13/00* | (2006.01) | |
| *F01L 1/18* | (2006.01) | |
| *F02M 26/05* | (2016.01) | |
| *F02M 26/06* | (2016.01) | |
| *F02M 26/10* | (2016.01) | |
| *F02M 26/01* | (2016.01) | |
| *F02M 26/15* | (2016.01) | |
| *F02M 26/25* | (2016.01) | |

(52) U.S. Cl.
CPC ............ *F01L 13/0036* (2013.01); *F02D 9/04* (2013.01); *F02D 13/0242* (2013.01); *F02D 13/0273* (2013.01); *F02D 41/006* (2013.01); *F02D 41/0052* (2013.01); *F02M 26/01* (2016.02); *F02M 26/05* (2016.02); *F02M 26/06* (2016.02); *F02M 26/10* (2016.02); *F01L 2001/186* (2013.01); *F01L 2013/001* (2013.01); *F01L 2800/10* (2013.01); *F02D 2200/0812* (2013.01); *F02D 2250/34* (2013.01); *F02M 26/15* (2016.02); *F02M 26/25* (2016.02); *Y02T 10/18* (2013.01); *Y02T 10/47* (2013.01)

(58) Field of Classification Search
CPC ........... F02D 41/006; F02D 2009/0276; F02D 41/029; F02D 9/04; F02D 21/08; F02D 41/0052; F02D 13/0242; F02D 13/0273; F02D 2200/0812; F02D 2250/34; F02D 41/0055; F02D 41/0065; F02D 41/0072; F02D 41/1466; F02D 41/0235; F02D 41/0275; F01N 9/002; F01N 3/021; F01N 13/02; F01N 2240/20; F01L 1/185; F01L 13/0005; F01L 13/0036; F01L 2001/186; F01L 2013/001; F01L 2800/10; Y02T 10/18; Y02T 10/47

See application file for complete search history.

(56) References Cited

U.S. PATENT DOCUMENTS

| | | | |
|---|---|---|---|
| 5,927,075 A * | 7/1999 | Khair | 60/605.2 |
| 6,481,200 B1 * | 11/2002 | Hirota et al. | 60/284 |
| 6,925,976 B2 * | 8/2005 | Israel et al. | 123/90.12 |
| 7,107,761 B2 * | 9/2006 | Fukuma et al. | 60/285 |
| 7,934,486 B1 * | 5/2011 | Styles et al. | 123/406.23 |
| 7,945,377 B1 * | 5/2011 | Van Nieuwstadt | F02D 41/0065 123/568.23 |
| 8,051,645 B2 * | 11/2011 | Chamarthi et al. | 60/295 |
| 2003/0106542 A1 * | 6/2003 | Aoyama et al. | 123/568.14 |
| 2008/0016855 A1 * | 1/2008 | Kogo et al. | 60/295 |
| 2008/0047509 A1 * | 2/2008 | Sellnau et al. | 123/90.15 |
| 2008/0148729 A1 * | 6/2008 | Endo | 60/605.2 |
| 2008/0196395 A1 * | 8/2008 | Hashizume | 60/295 |
| 2009/0038308 A1 * | 2/2009 | Nagae | 60/602 |
| 2009/0044514 A1 * | 2/2009 | Brahma et al. | 60/274 |
| 2009/0188235 A1 * | 7/2009 | Robel et al. | 60/276 |
| 2010/0005782 A1 * | 1/2010 | Foster et al. | 60/277 |
| 2010/0126142 A1 * | 5/2010 | Murata et al. | 60/278 |
| 2010/0132339 A1 * | 6/2010 | Barkhage | 60/287 |
| 2010/0274463 A1 * | 10/2010 | Itoga et al. | 701/102 |
| 2011/0114067 A1 * | 5/2011 | Gonzalez Delgado et al. | 123/568.11 |
| 2012/0137997 A1 | 6/2012 | Hayman | |

\* cited by examiner

CONTROL OF ENGINE EGR WITH BACKPRESSURE CONTROL VALVE

FIELD

The present disclosure relates to engine exhaust gas recirculation systems.

BACKGROUND

This section provides background information related to the present disclosure which is not necessarily prior art.

Internal combustion engines may include exhaust gas recirculation systems to provide exhaust gas to the combustion chambers for a subsequent combustion event. In order to provide exhaust gas flow to the combustion chambers a pressure differential is needed between the exhaust flow path of the engine and the location in the intake system where the exhaust gas is reintroduced.

SUMMARY

A method of controlling engine internal exhaust gas recirculation may include estimating a flow restriction through a diesel particulate filter in an exhaust system of an engine assembly and adjusting a backpressure control valve in the exhaust system downstream of the diesel particulate filter based on the flow restriction. A controlled amount of internal exhaust gas recirculation may be provided to the engine assembly based on adjusting the backpressure control valve.

An engine assembly may operate according the method of controlling engine internal exhaust gas recirculation and may include an engine structure, intake and exhaust systems, an exhaust gas recirculation system and a control module. The engine structure may define a combustion chamber and intake and exhaust ports in communication with the combustion chamber. The intake system may be in communication with the intake port. The exhaust system may include an exhaust conduit in communication with the exhaust port, a diesel particulate filter located in the exhaust conduit and a backpressure control valve located in the exhaust conduit downstream of the diesel particulate filter. The exhaust gas recirculation system may selectively provide internal exhaust gas recirculation. The control module may be in communication with the backpressure control valve and may be adapted to estimate a flow restriction through the diesel particulate filter, adjust the backpressure control valve position based on the flow restriction and provide a controlled amount of internal exhaust gas recirculation to the engine assembly based on the adjusted backpressure control valve position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. As used herein, the term "module" refers to an application specific integrated circuit (ASIC), an electronic circuit, and/or a processor (shared, dedicated, or group) and memory that execute one or more software or firmware programs.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
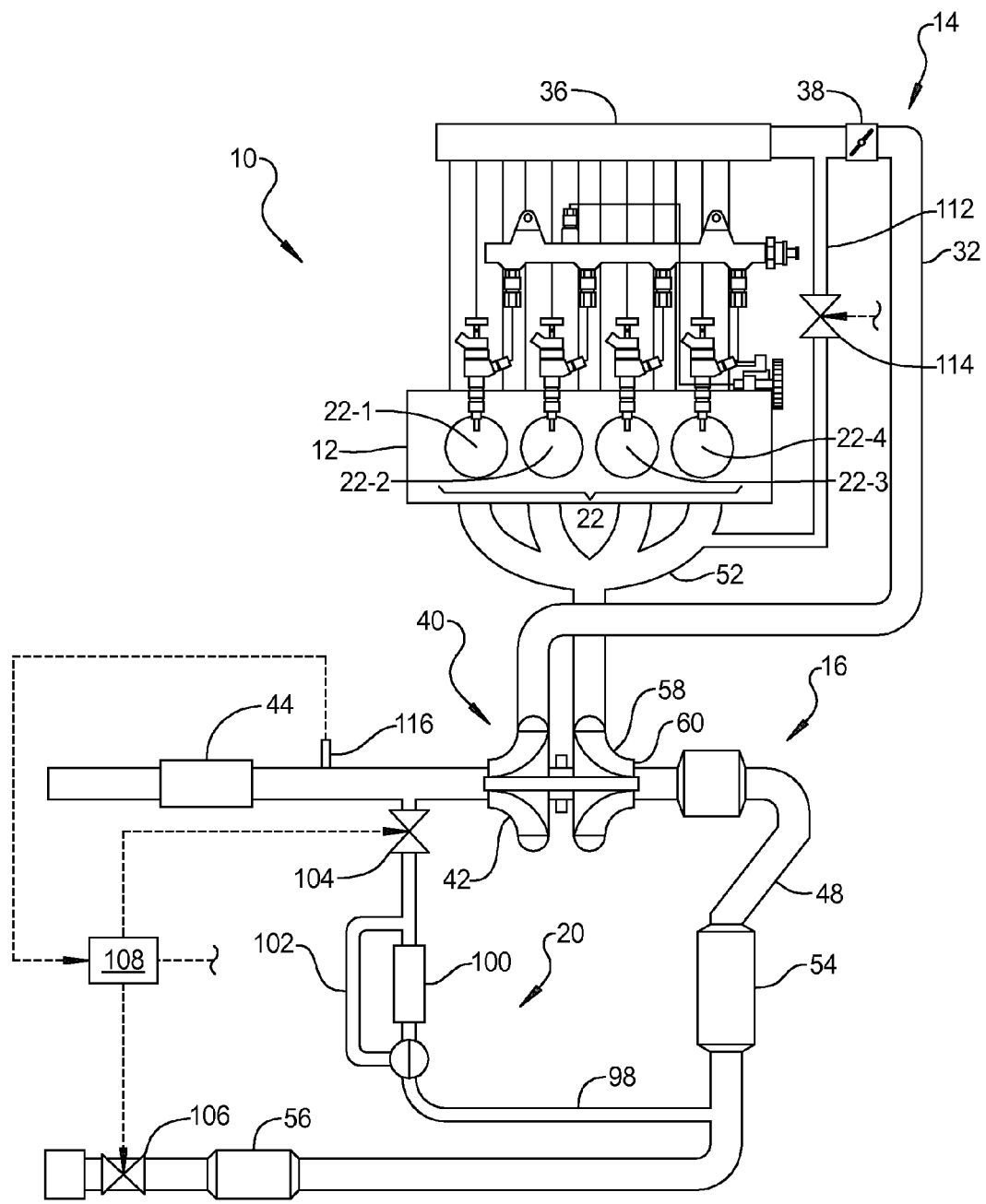
FIG. 1 is a schematic illustration of an engine assembly according to the present disclosure.
Figure 2:
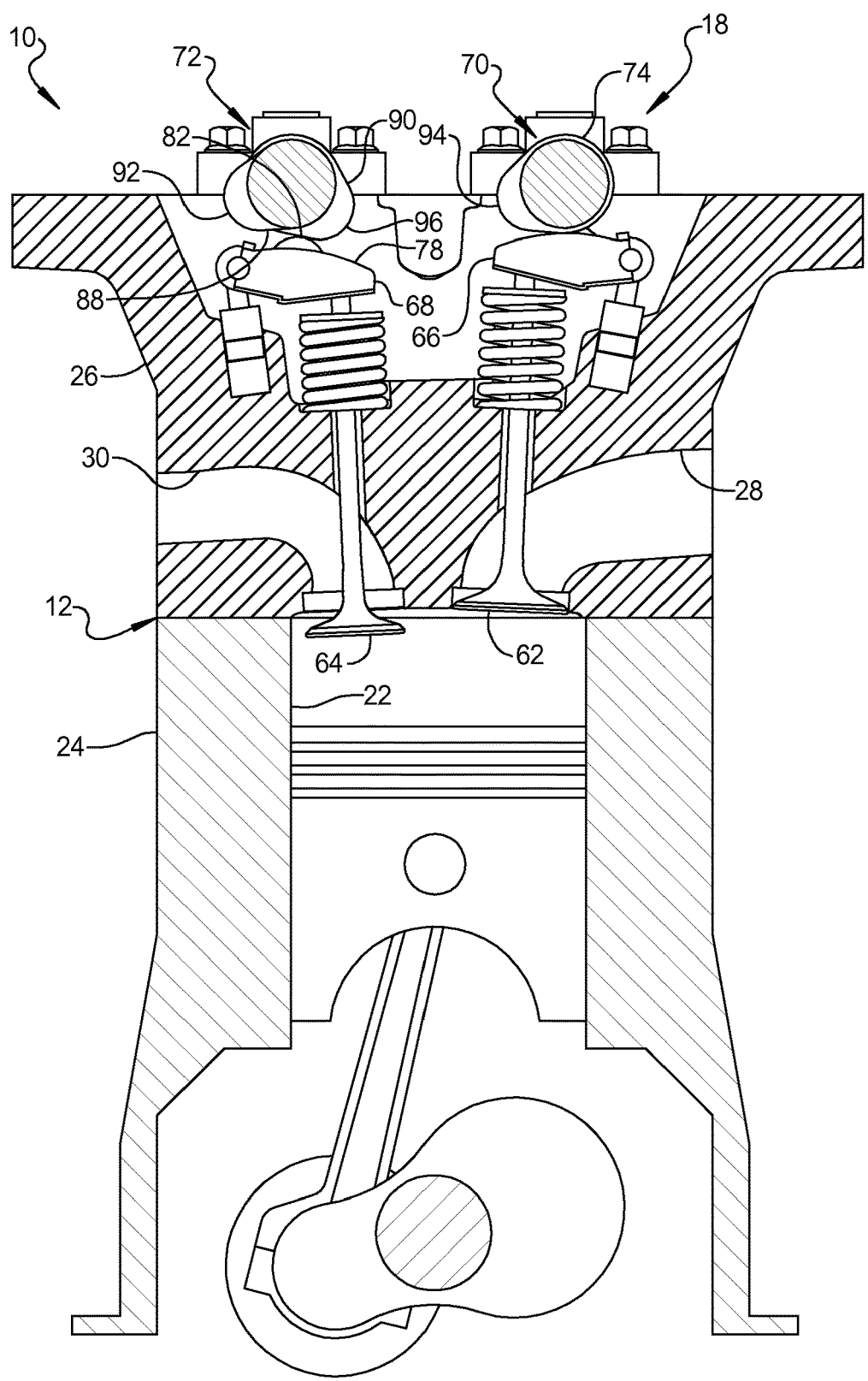
FIG. 2 is a schematic section view of the engine assembly from FIG. 1.

With reference to FIGS. 1 and 2, an engine assembly 10 may include an engine structure 12, an intake system 14, an exhaust system 16, a valvetrain assembly 18 and an exhaust gas recirculation (EGR) assembly 20. The engine structure 12 may define cylinder bores 22 forming combustion chambers. The engine structure 12 may include an engine block 24 defining the cylinder bores 22 and a cylinder head 26 coupled to the engine block 24 and defining intake and exhaust ports 28, 30 in communication with the combustion chambers.

An inline engine configuration having four cylinders (22-1, 22-2, 22-3, 22-4) is schematically shown in FIG. 1 for illustration purposes only with a single cylinder illustrated in the section view shown in FIG. 2 for simplicity. It is understood that the features discussed relative to the cylinder shown in FIG. 2 apply equally to the remaining cylinders of the engine assembly 10. Additionally, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The intake system 14 may include an intake conduit 32, an intake manifold 36 coupled to the cylinder head 26 and in communication with the intake conduit 32, a throttle valve 38 in the intake conduit 32 and controlling air flow to intake port 28 through the intake manifold 36, a turbocharger 40 including an intake side 42 (compressor) located in the intake conduit 32 and an air cleaner 44 located in the intake conduit 32. The intake conduit 32 may define an air inlet into the intake system 14 and the turbocharger 40 may be in communication with the intake ports 28 via the intake manifold 36. While a single turbocharger 40 is illustrated, it is understood that the present disclosure applies equally to arrangements including multiple turbochargers.

The exhaust system 16 may include an exhaust conduit 48, an exhaust manifold 52 coupled to the cylinder head 26 and in communication with the exhaust conduit 48, and a diesel particulate filter (DPF) 54 and a selective catalytic reduction (SCR) catalyst 56 located in the exhaust conduit 48. While illustrated as including an individual DPF 54 and an individual SCR catalyst 56, it is understood that the present disclosure is not limited to such arrangements. The DPF 54 may alternatively be included in a combined DPF/SCR catalyst. Further, the SCR catalyst 56 may alternatively be located upstream of the DPF 54 or an additional SCR catalyst (not shown) may be included upstream of the DPF 54. The exhaust side 58 (turbine) of the turbocharger 40 may be located in the exhaust conduit 48 and may include a turbine wheel in communication with and driven by exhaust gas flowing through the exhaust conduit 48. The exhaust side 58 of the turbocharger 40 may include a variable exhaust gas inlet 60 that controls an exhaust gas flow restriction through the turbocharger 40. The variable exhaust gas inlet 60 may be in the form of a variable nozzle through actuation of stator vanes of the turbine to direct exhaust gas flow into the turbine at different angles.

Figure 3:
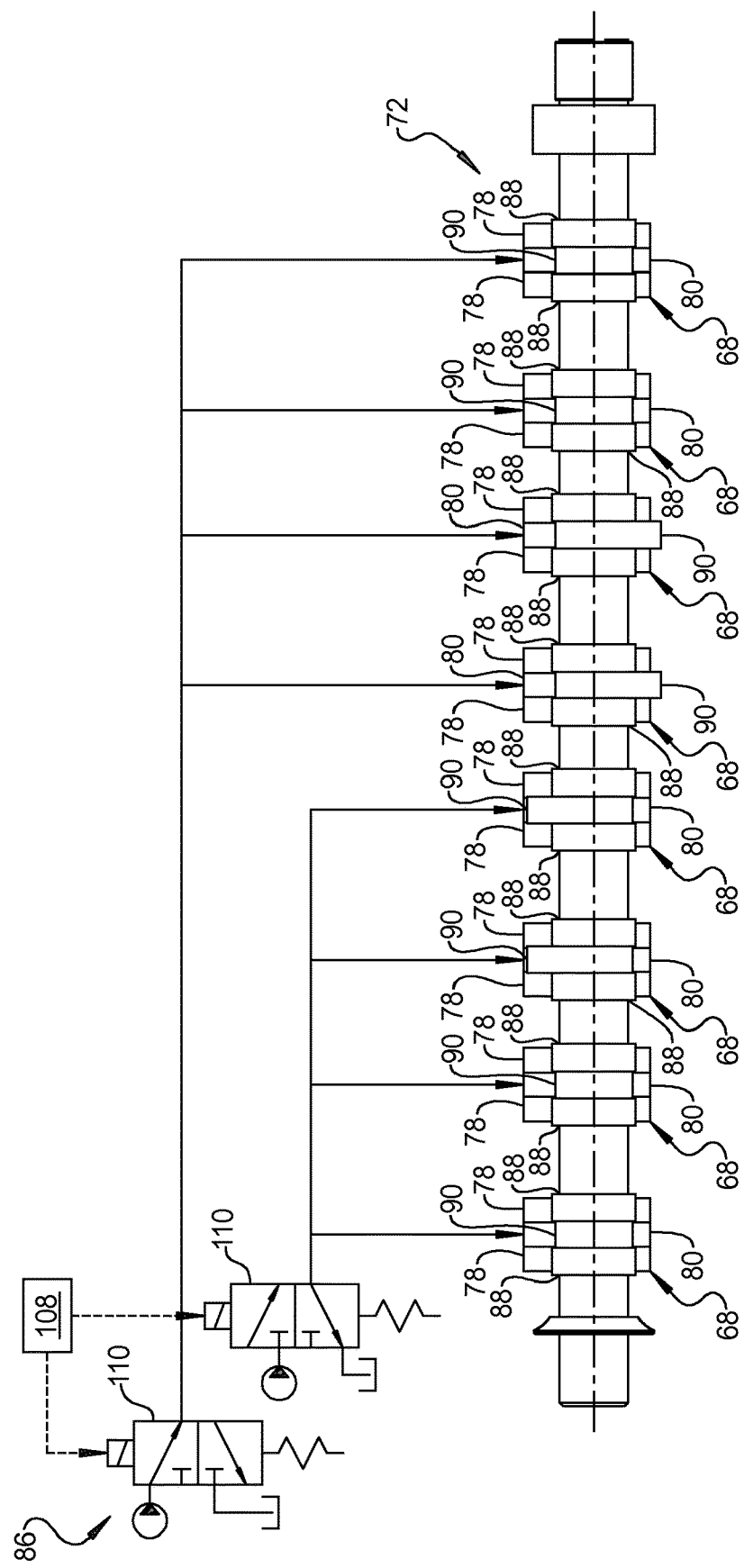
FIG. 3 is a schematic illustration of the valvetrain assembly shown in FIG. 2.

As seen in FIGS. 2 and 3, the valvetrain assembly 18 may include intake valves 62 located in the intake ports 28, exhaust valves 64 located in the exhaust ports 30, intake valve lift mechanisms 66 supported on the cylinder head 26 and engaged with the intake valves 62, exhaust valve lift mechanisms 68 supported on the cylinder head 26 and engaged with the exhaust valves 64, an intake camshaft 70 supported for rotation on the cylinder head 26 and engaged with the intake valve lift mechanisms 66 and an exhaust camshaft 72 supported for rotation on the cylinder head 26 and engaged with the exhaust valve lift mechanisms 68. The intake camshaft 70 may include intake cam lobes 74 engaged with each of the intake valve lift mechanisms 66. The intake camshaft 70 may include an intake cam phaser (not shown) and the intake valve lift mechanism 66 may take a variety of forms including, but not limited to, conventional or variable valve lift mechanisms.

Figure 4:
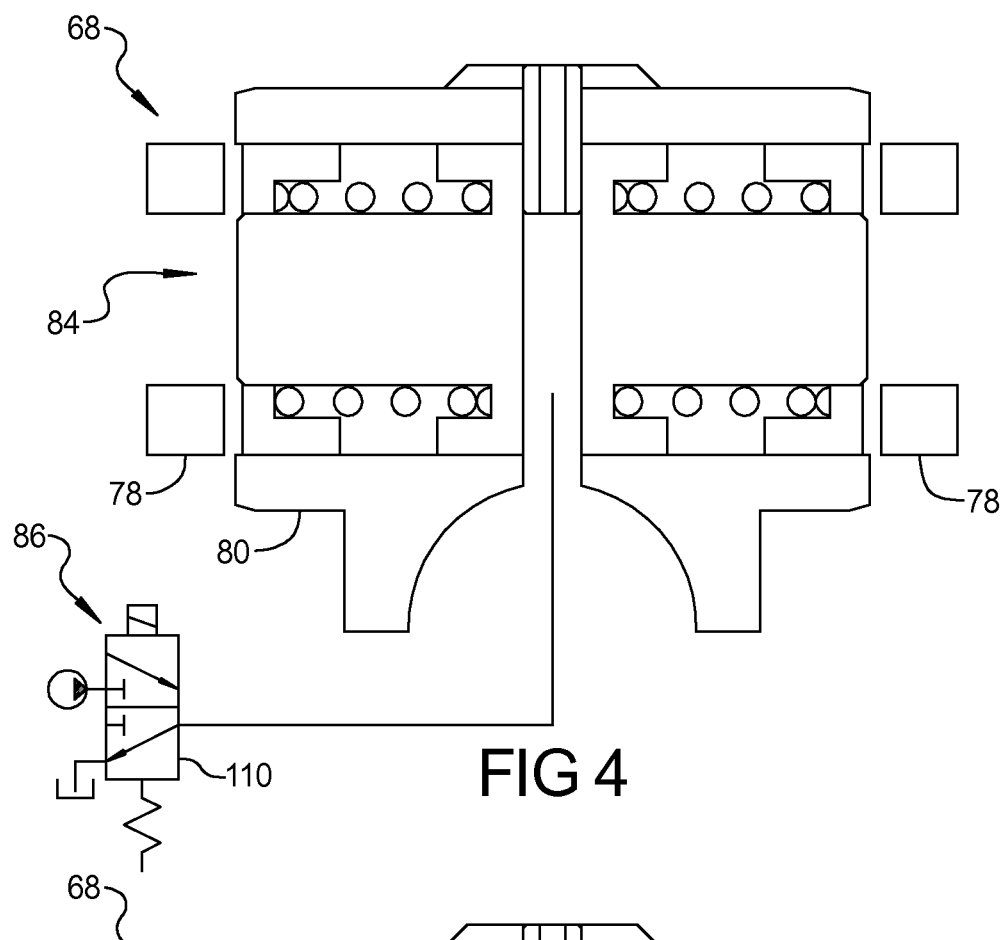
FIG. 4 is a schematic section view of an exhaust valve lift mechanism from the valvetrain assembly shown in FIGS. 2 and 3.
Figure 5:
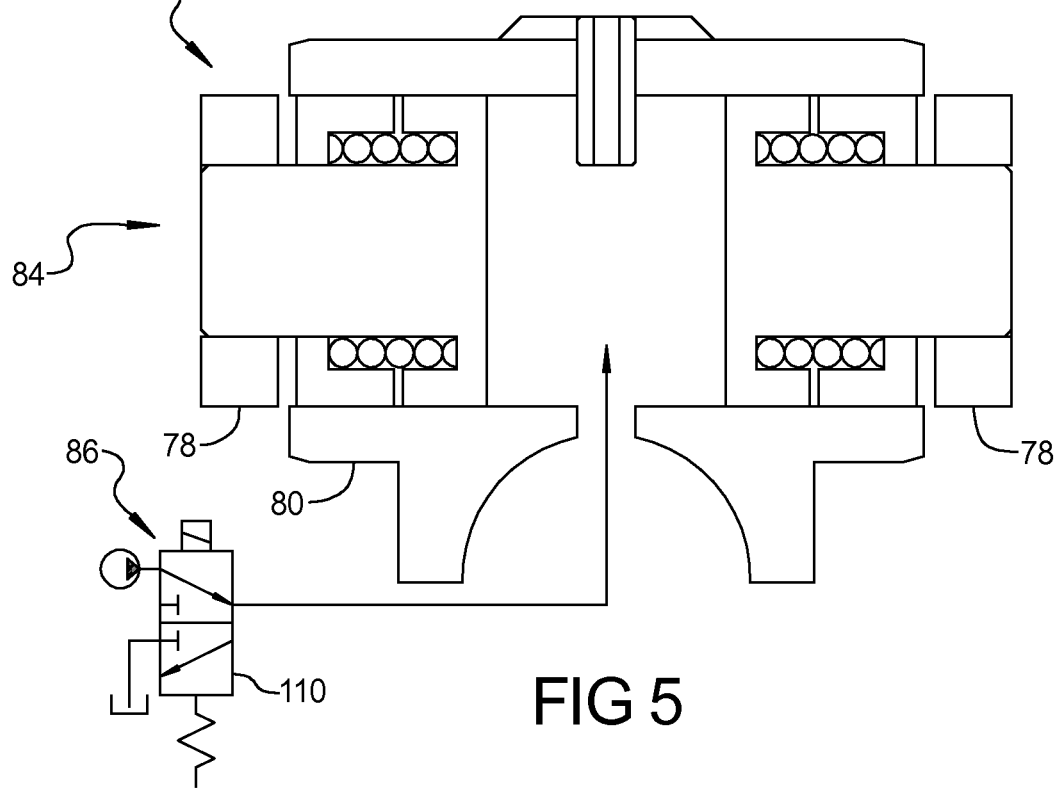
FIG. 5 is an additional schematic section view of the exhaust valve lift mechanism from the valvetrain assembly shown in FIGS. 2 and 3.

The exhaust valve lift mechanisms 68 may form hydraulically actuated deactivating valve lift mechanisms operable in first and second modes. In the present non-limiting example, and as seen in FIGS. 2-5, the exhaust valve lift mechanism 68 may be in the form of a rocker arm including a pair of outer arms 78, an inner arm 80 including a roller 82 and a locking mechanism 84 selectively coupling the outer arms 78 to the inner arm 80. As seen in FIGS. 4 and 5, the locking mechanism 84 may be switched between locked (FIG. 5) and unlocked (FIG. 4) positions by a pressurized fluid supply 86 (such as pressurized oil). The locking mechanism 84 may be normally biased to the unlocked position (FIG. 4) for operation in the second mode. The locking mechanism 84 may secure the outer arms 78 for displacement with the inner arm 80 during the first mode (FIG. 5) and may allow relative displacement between the outer arms 78 and the inner arm 80 during the second mode (FIG. 4). While both exhaust valve lift mechanisms 68 for each cylinder are shown as deactivating valve lift mechanisms in FIG. 3, it is understood that the present disclosure is not limited to such arrangements and applies equally to arrangements where only one exhaust valve lift mechanism 68 per cylinder is a deactivating valve lift mechanism.

The exhaust camshaft 72 may include a first exhaust cam lobe 88 engaged with each of the outer arms 78 and a second exhaust cam lobe 90 located between the first exhaust cam lobes 88 and engaged with the inner arm 80. Each of the first exhaust cam lobes 88 may define an EGR lift region 92 at least partially rotationally aligned with an intake lift region 94 defined by a corresponding one of the intake cam lobes 74. The second exhaust cam lobes 90 may define exhaust lift regions 96 rotationally offset from the EGR lift region 92 and the intake lift regions 94.

As seen in FIG. 2, the lift regions 92, 94, 96 may generally be defined as regions of the cam lobes 74, 88, 90 including lobe peaks that extend from a base circle region to provide valve lift. The exhaust valve 64 may be displaced to an open position when the peak of the second exhaust cam lobe 90 engages the exhaust valve lift mechanism 68 during both the first and second modes. The exhaust valve 64 may be displaced to an open position when the peaks of the first exhaust cam lobes 88 engage the exhaust valve lift mechanism 68 during the first mode and the exhaust valve 64 may remain in the closed position when the peaks of the first exhaust cam lobes 88 engage the exhaust valve lift mechanism 68 during the second mode. The first exhaust cam lobes 88 may provide internal exhaust gas recirculation when the exhaust valve lift mechanism 68 is operated in the first mode.

Figure 6:
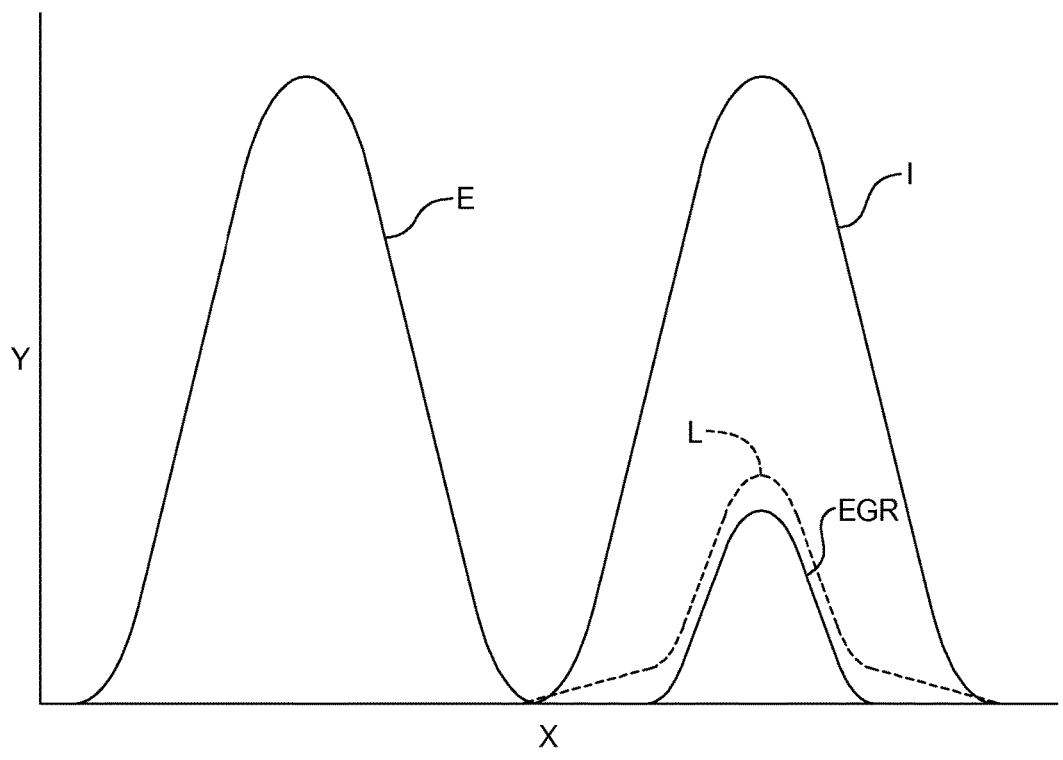
FIG. 6 is a graphical illustration of intake and exhaust valve opening provided by the engine assembly of FIGS. 1-5.

As seen in FIG. 6, the exhaust valve 64 may completely close between an exhaust valve lift event (E) provided by the exhaust cam lobe 90 and a subsequent EGR valve lift event (EGR) provided by the EGR cam lobes 88 during operation of the exhaust valve lift mechanism 68 in the first mode. The lift of the exhaust valve 64 provided during the EGR valve lift event (EGR) may correspond to between twenty percent and sixty percent of the peak lift of the exhaust valve 64 provided during the exhaust valve lift event (E). Additionally, an entirety of the opening of the exhaust valve 64 by the EGR lift region 92 during the first mode may occur while a corresponding intake valve 62 (i.e., intake valve for the same cylinder) is open as illustrated by the intake valve lift event (I).

The lash-less lift (L) illustrated in FIG. 6 corresponds to the lost motion provided by the engagement between the EGR lift region 92 and the exhaust valve lift mechanism 68 during the first mode. More specifically, the outer arms 78 may be displaced by the EGR cam lobe 88 a predetermined amount during the first mode before the exhaust valve 64 is displaced from the closed position. The difference between the lash-less lift (L) and the EGR valve lift event (EGR) in FIG. 6 illustrates a non-limiting example of the lost motion engagement between the EGR lift region 92 of the EGR cam lobe 88 and the outer arms 78 during the first mode. The initial lost motion provided by the engagement between the EGR lift region 92 and the exhaust valve lift mechanism 68 during the first mode may accommodate part tolerances to maintain EGR valve lift event (EGR) outside of the exhaust valve lift event (E) and within the intake valve lift event (I).

The exhaust gas recirculation assembly 20 may include an EGR line 98, an EGR cooler 100 and cooler bypass 102 located in the EGR line 98, an EGR control valve 104 and a backpressure control valve 106. The EGR line 98 may extend from the exhaust conduit 48 at a location between the turbocharger 40 and an outlet of the exhaust conduit 48 to the intake system 14 to provide communication between the intake and exhaust systems 14, 16.

In the non-limiting example shown in FIG. 1, the EGR control valve 104 may be located at the outlet of the EGR line 98 and may control exhaust gas recirculation flow to the intake system 14 from the EGR line 98. The backpressure control valve 106 may be located in the exhaust conduit 48 at a location between the EGR line 98 and an outlet of the EGR line 98. In the non-limiting example shown in FIG. 1, the backpressure control valve 106 is located at the outlet of the exhaust conduit 48. The DPF 54 may be located in the exhaust conduit 48 at a location between the exhaust side 58 of the turbocharger 40 and the backpressure control valve 106. The arrangement discussed above provides an internal EGR system in combination with a low pressure EGR system.

More specifically, the engine assembly 10 may additionally include a control module 108 in communication with the EGR control valve 104 and the backpressure control valve 106. As seen in FIGS. 3-5, the pressurized fluid supply 86 for the exhaust valve lift mechanisms 68 may include oil control valves 110 in communication with and controlled by the control module 108.

The backpressure control valve 106 may be used to control the pressure differential between the intake system 14 and the exhaust system 16 for both the internal EGR system and the low pressure EGR system to adjust recirculation of exhaust gas in the engine assembly 10. The exhaust valve lift mechanisms 68 and the EGR control valve 104 may be adjusted by the control module 108 to provide a desired amount of exhaust gas recirculation during engine operation. The throttle valve 38 and the variable exhaust gas inlet 60 of the turbocharger 40 may also be used to control the pressure differential between the intake system 14 and the exhaust system 16 to further adjust the amount of exhaust gas recirculated in the engine assembly 10. In some arrangements, the exhaust gas recirculation assembly 20 may additionally include a bypass passage 112 and a bypass valve 114 located in the bypass passage 112 and in communication with the control module 108. The bypass passage 112 may extend from the exhaust manifold 52 to a region of the intake conduit 32 located between the intake throttle valve 38 and the intake manifold 36 to provide further control of exhaust gas recirculation.

In the arrangement discussed above, the internal EGR system may be used as the high pressure EGR system, eliminating the typical high pressure EGR lines and cooler, eliminating the potential for high pressure EGR cooler fouling.

The control module 108 may adjust the position of the backpressure control valve 106 based on the flow restriction through the DPF 54 resulting from the soot level of the DPF 54. The backpressure control valve 106 may be adjusted to provide a desired exhaust gas recirculation rate and a desired air flow into the engine assembly 10.

Figure 7:
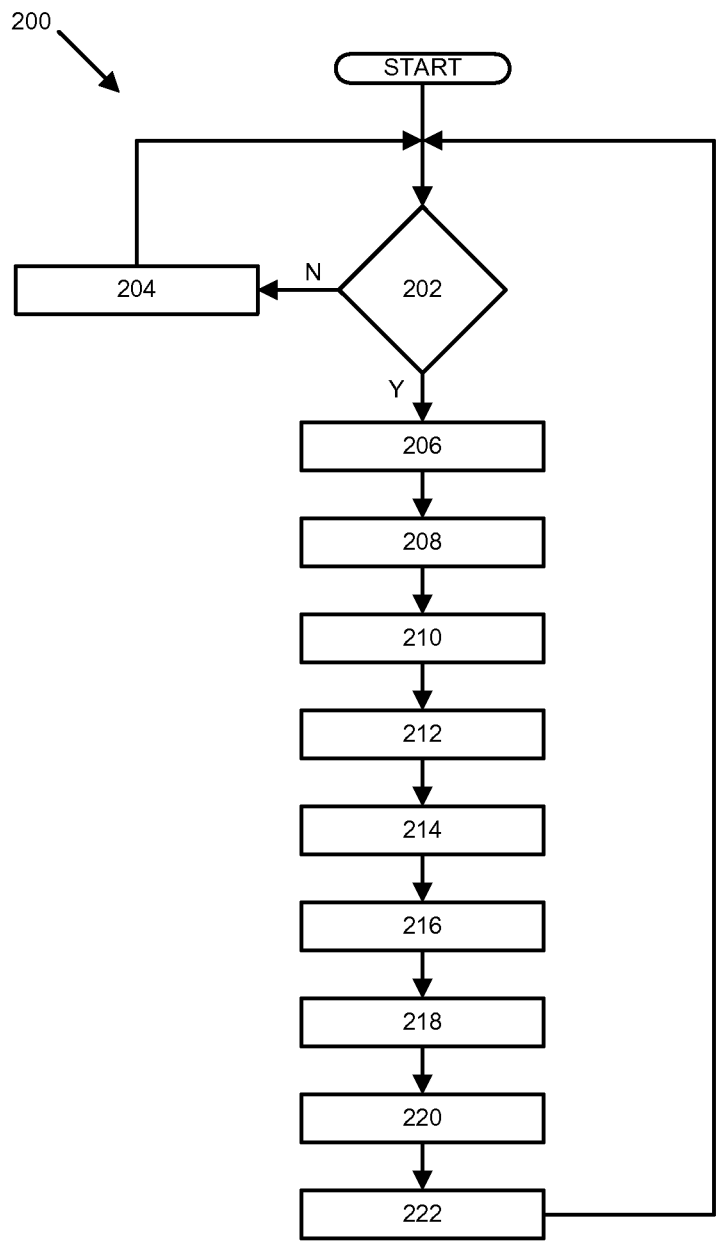
FIG. 7 is a flow chart illustrating control of the backpressure control valve from the engine assembly of FIG. 1.

As seen in FIG. 7, control logic 200 for the control module 108 is illustrated and may begin at step 202 where the combustion mode of the engine assembly 10 is evaluated. If the combustion mode does not include internal EGR, control logic 200 may proceed to step 204 where the backpressure control valve 106 is set to a fully open position. Control logic 200 may then return to step 202 during engine operation for subsequent evaluation of the combustion mode.

If the combustion mode includes internal EGR, the control module 108 may estimate a flow restriction through the DPF 54, adjust the backpressure control valve 106 based on the flow restriction, and provide a controlled amount of exhaust gas recirculation to the engine assembly 10 based on the adjusted the backpressure control valve 106 position. The controlled amount of exhaust gas recirculation to the engine assembly 10 may include opening the backpressure control valve 106 to reduce a flow restriction through the backpressure control valve 106 when the flow restriction through the DPF 54 increases.

More specifically, control logic 200 may proceed to step 206 where an engine operating point is determined. The engine operating point may include engine speed and load conditions. Control logic 200 may then determine an initial backpressure control valve 106 position at step 208 based on the engine speed and load conditions. An adjusted backpressure control valve 106 position may be determined at step 210. The adjusted backpressure control valve 106 position may be based at least partially on the flow restriction through the DPF 54. The flow restriction may be determined based on a soot load in the DPF 54.

By way of non-limiting example, an estimated soot load in the DPF 54 may be determined based on a DPF soot model and an estimated opening of the backpressure control valve 106 may be determined based on the estimated soot load. A soot load correction may then be determined as a function of engine speed and fuel quantity and may be applied to the estimated opening of the backpressure control valve 106. The corrected opening of the backpressure control valve 106 may then be applied to a base position of the backpressure control valve 106 to increase opening of the backpressure control valve 106 and accommodate the increased backpressure provided by the soot load.

The position of the backpressure control valve 106 may be further adjusted based on engine air flow. More specifically, at step 212, control logic 200 may determine engine mass air flow from mass air flow (MAF) sensor 116. A target (or desired) mass air flow rate may then be determined at step 214 based on current engine operating conditions including engine speed and load. The target air flow rate may then be adjusted at step 216 based on coolant temperature, air temperature and altitude. A difference between the actual air flow rate and the target air flow rate may be determined at step 218. A final adjusted backpressure control valve 106 position may then be determined at step 220 based on the adjusted backpressure control valve 106 position based on soot load determined at step 210 and the difference between the actual air flow rate and the target air flow rate at step 220. The backpressure control valve 106 position may then be set at step 222.

As noted above, the controlled amount of exhaust gas recirculation provided to the engine assembly 10 may include internal EGR resulting from the exhaust valve 64 being open during at least a portion of an intake stroke of the combustion chamber with the amount of exhaust gas recirculation being controlled by a pressure differential between the exhaust system 16 and the intake system 14 provided by adjusting the backpressure control valve 106 position. The communication between the exhaust system 16 and the intake system 14 by EGR line 98 may also be controlled by the backpressure control valve 106.

What is claimed is:

1. A method comprising:
    estimating a flow restriction through a diesel particulate filter in an exhaust system of an engine assembly;
    adjusting a backpressure control valve in the exhaust system downstream of the diesel particulate filter based on the flow restriction; and
    providing a controlled amount of internal exhaust gas recirculation to the engine assembly based on an adjustment of the backpressure control valve.

2. The method of claim 1, wherein the providing the controlled amount of internal exhaust gas recirculation to the engine assembly includes an exhaust valve for a combustion chamber being open during an intake stroke of the combustion chamber with the amount of internal exhaust gas recirculation being controlled by a pressure differential between the exhaust system and an intake system of the engine assembly provided by an adjustment of the backpressure control valve.

3. The method of claim 2, wherein the engine assembly includes a turbocharger in communication with the intake and exhaust systems and an EGR line extending from the exhaust system at a location between the turbocharger and the backpressure control valve to the intake system to provide additional communication between the intake and exhaust systems.

4. The method of claim 1, wherein providing a controlled amount of internal exhaust gas recirculation to the engine assembly includes opening the backpressure control valve to reduce a flow restriction through the backpressure control valve when the flow restriction through the diesel particulate filter increases.

5. The method of claim 1, wherein estimating the flow restriction through the diesel particulate filter includes estimating a soot level in the diesel particulate filter.

6. The method of claim 5, wherein estimating the soot level in the diesel particulate filter includes referencing a soot model and adjusting the backpressure control valve includes increasing opening of the backpressure control valve as the soot level increases.

7. The method of claim 6, further comprising determining an estimated backpressure control valve position based on the estimated soot level, determining a correction factor for the estimated backpressure control valve position based on engine speed and adjusting the backpressure control valve position based on the estimated backpressure control valve position and the correction factor.

8. The method of claim 7, further comprising determining an actual air flow rate into the engine assembly and a target air flow rate at current engine operating conditions and adjusting the backpressure control valve based on a difference between the actual air flow rate and the target air flow rate to provide an air flow rate to the engine assembly within a predetermined threshold of the target air flow rate.

9. The method of claim 8, wherein the providing the controlled amount of internal exhaust gas recirculation to the engine assembly includes an exhaust valve for a combustion chamber being open during an intake stroke of the combustion chamber with the amount of internal exhaust gas recirculation being controlled by a pressure differential between the exhaust system and an intake system of the engine assembly provided by the adjusting the backpressure control valve.

10. An engine assembly comprising:
    an engine structure defining a combustion chamber and intake and exhaust ports in communication with the combustion chamber;
    an intake system in communication with the intake port;
    an exhaust system including:
        an exhaust conduit in communication with the exhaust port;
        a diesel particulate filter located in the exhaust conduit; and
        a backpressure control valve located in the exhaust conduit downstream of the diesel particulate filter;
    an internal exhaust gas recirculation system selectively providing internal exhaust gas recirculation; and
    a control module in communication with the backpressure control valve and adapted to estimate a flow restriction through the diesel particulate filter, adjust the backpressure control valve position based on the flow restriction and provide a controlled amount of internal exhaust gas recirculation to the engine assembly based on the adjusted backpressure control valve position.

11. The engine assembly of claim 10, further comprising a valvetrain assembly including an intake valve located in the intake port, an intake valve lift mechanism engaged with the intake valve, an intake cam lobe engaged with the intake valve lift mechanism and defining an intake lift region adapted to open the intake valve, an exhaust valve located in the exhaust port, an exhaust valve lift mechanism engaged with the exhaust valve, and a first exhaust cam lobe engaged with the exhaust valve lift mechanism and defining an EGR lift region at least partially rotationally aligned with the intake lift region and adapted to open the exhaust valve, the exhaust valve lift mechanism being operable in first and second modes, the first mode including the exhaust valve being opened when the EGR lift region engages the exhaust valve lift mechanism and the second mode including the exhaust valve lift mechanism maintaining the exhaust valve in a closed position when the EGR lift region engages the exhaust valve lift mechanism.

12. The engine assembly of claim 11, wherein the controlled amount of internal exhaust gas recirculation includes the exhaust valve being open during an intake stroke of the combustion chamber with the amount of internal exhaust gas recirculation being controlled by a pressure differential between the exhaust system and an intake system of the engine assembly provided by the adjusted backpressure control valve position.

13. The engine assembly of claim 12, further comprising:
    an EGR line extending from the exhaust conduit at a location downstream of the diesel particulate filter to the intake system and providing communication between the intake and exhaust systems; and
    a turbocharger in communication with the exhaust conduit and the intake port and driven by exhaust gas flowing through the exhaust conduit with the turbocharger being in communication with the exhaust conduit at a location upstream of the EGR line.

14. The engine assembly of claim 10, wherein the control module is adapted to open the backpressure control valve to reduce a flow restriction through the backpressure control valve when the flow restriction through the diesel particulate filter increases.

15. The engine assembly of claim 14, wherein the estimated flow restriction through the diesel particulate filter includes an estimated soot level in the diesel particulate filter.

16. The engine assembly of claim 10, wherein the control module includes a soot model for estimating a soot level in the diesel particulate filter, the control module adapted to increase opening of the backpressure control valve as the soot level increases.

17. The engine assembly of claim 16, wherein the control module is adapted to determine an estimated backpressure control valve position based on the estimated soot level, determine a correction factor for the estimated backpressure control valve position based on engine speed and adjust the backpressure control valve position based on the estimated backpressure control valve position and the correction factor.

18. The engine assembly of claim 17, further comprising a mass air flow sensor in communication with the control module that provides an actual air flow rate into the engine assembly to the control module, the control module being adapted to determine a target air flow rate at current engine operating conditions and adjust the backpressure control valve based on a difference between the actual air flow rate and the target air flow rate to provide an air flow rate to the engine assembly within a predetermined threshold of the target air flow rate.

19. The engine assembly of claim 18, further comprising a valvetrain assembly including an intake valve located in the intake port, an intake valve lift mechanism engaged with the intake valve, an intake cam lobe engaged with the intake valve lift mechanism and defining an intake lift region adapted to open the intake valve, an exhaust valve located in the exhaust port, an exhaust valve lift mechanism engaged with the exhaust valve, and a first exhaust cam lobe engaged with the exhaust valve lift mechanism and defining an EGR lift region at least partially rotationally aligned with the intake lift region and adapted to open the exhaust valve, the exhaust valve lift mechanism being operable in first and second modes, the first mode including the exhaust valve being opened when the EGR lift region engages the exhaust valve lift mechanism and the second mode including the exhaust valve lift mechanism maintaining the exhaust valve in a closed position when the EGR lift region engages the exhaust valve lift mechanism, the controlled amount of internal exhaust gas recirculation provided to the engine assembly including the exhaust valve being open during an intake stroke of the combustion chamber with the amount of internal exhaust gas recirculation being controlled by a pressure differential between the exhaust system and an intake system of the engine assembly provided by the adjusted backpressure control valve position.

* * * * *